June 19, 1928.

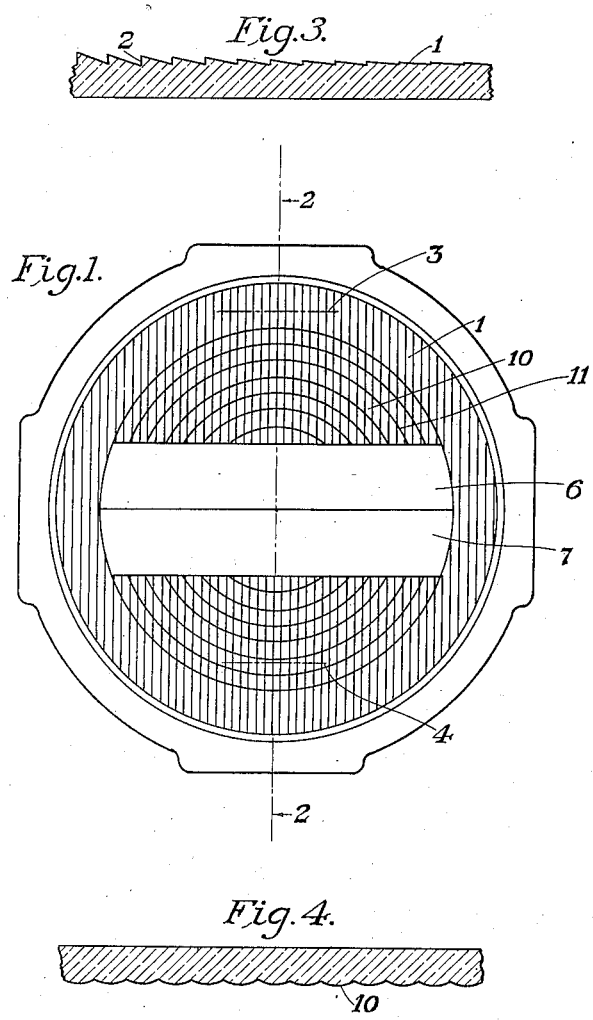

W. H. ZORGER 1,674,460

AUTOMOBILE HEADLIGHT LENS

Filed Oct. 24, 1925

Witnesses.

Inventor.

William Herschel Zorger

Patented June 19, 1928.

1,674,460

UNITED STATES PATENT OFFICE.

WILLIAM H. ZORGER, OF CHAMPAIGN, ILLINOIS.

AUTOMOBILE HEADLIGHT LENS.

Application filed October 24, 1925. Serial No. 64,678.

In the United States Patent No. 1,604,213, granted to me October 26, 1926, I have shown a lens or glass front, for use in connection with the parabolic reflector, which by its window and border, allows two different beams of light.

This lens converts all the light projected from the central area of the reflector, except a neutral zone one inch in width extending horizontally through the central area of the reflector, into a double half cone of light, said cones produced by circular prisms, concentrically arranged from a common center.

This so modifies the beam from the central area of the reflector, that it is spread widely but no rays are projected higher than the reflector axis. The beams from the center and border, are not by this lens kept below the reflector axis, but form a separate higher beam, very concentrated, which is projected directly forward, in direct line with the reflector axis.

It is the object of the present invention to improve this distribution of the light, by covering a substantial area of the border of the reflector, at least, with prisms, so arranged and having a prismatic strength, sufficient and so adjusted as to turn all this concentrated border light, to the right of the reflector axis.

Heretofore, glare has been generally sought to be controlled, by keeping all the light below the lamp axis, by using prisms or by tilting the lamps or by both using prisms and tilting, so as to keep the top of the wide beam below the lamp and thus below the eyes of opposing drivers.

In my former construction, this is necessary to prevent glare, because this border, concentrated light, is above the top of the wide half cone, formed by the concentrated ring prisms covering this central reflector area.

In the present construction, this concentrated light from the reflector border, is turned by the vertical prisms, so all its light falls to the right, in lieu of tilting this light down below the lamp center.

In the present arrangement, glare is controlled by tilting all the light, projected from the central area of the reflector, below the lamp center, while all the light from the border of the reflector is prevented from glaring opposing drivers, by a prism arrangement which turns it to the right of the lamp center.

This invention is novel and differs from my former construction, since the border light in this invention, is kept from glaring the opposing driver, by turning it to the right of the lamp center, whereas in the former construction, this border light is prevented from glaring by bodily tilting the lamps down, so as to throw this concentrated border beam below the eyes of opposing drivers.

This invention performs a double function to prevent glaring opposing drivers, by depressing the central beam and turning to the right of the lamp center the border beam, so it falls to the left of opposing drivers, while my former invention depends on the control of glare by depressing the entire beam.

This invention, produces an entirely different beam pattern, as compared with the ordinary glass fronts, in that a wide beam is produced with some 60% of the reflected light, in which glare is controlled by the regular way of tilting its top below lamp center, while with the remainder of the light, reflected from the border of the reflector, glare is controlled by turning it to the right of the lamp axis.

This double function of my invention, will be better understood, by a reference to the drawings, in which Figure 1 is a front view of my improved glass front.

Figure 2 is a vertical section through the center of Figure 1. Figure 3 is a horizontal section through the border of Figure 1 and shows the prism arrangement completely covering the border area of the lens. These prisms it will be observed have their base set to the right and faces to the left. Figure 4 is a horizontal section thru vertical cylindrical prisms which are superimposed upon and entirely cover all the concentric curved prisms shown in Figure 1.

Figure 5:
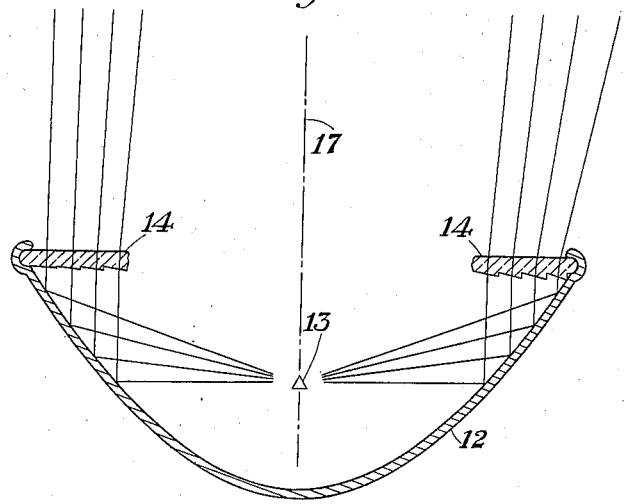
Figure 5, represents a horizontal section through the paraboloidal reflector and border portions of the lens showing the effect of these vertical border prisms covering this otherwise neutral zone of the lens and the way these prisms with their bases set to the right refract all the light passing through this border area of the lens.

Referring to the drawings in the several figures of which like parts are designated by similar reference characters, the filament 13, shown in Figure 5, represents the regular V-shaped filament and when placed with its flat surface in the horizontal plane of the reflector, a band of light of appreciable width is projected horizontally or parallel with the reflector axis.

Where laws do not limit "beam intensity," I prefer making all these border prisms, represented by 14, Figure 5, all the same depth and basic strength of .0075 inch more or less when made 1/8 inch in width and with an axis of from 90 to 170 degrees.

When these border prisms 14 Figure 5 are of the same basic strength, the light projected from the border area of the reflector covered by these border prisms, will be shifted bodily to the right, forming the original solid cone projected from this border area of the reflector, thus giving a greater projection of the cone than is possible were these border prisms "stepped up" the .0005 inch as shown by such a grading, 1 and 2 Figure 3.

Figure 6:
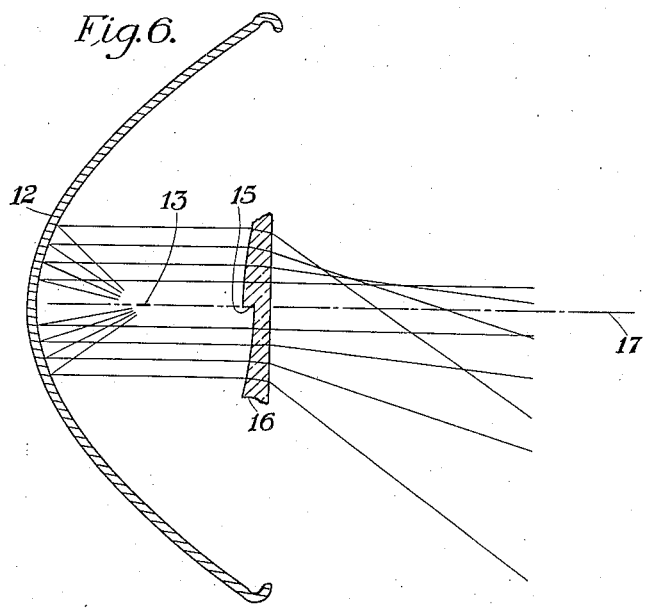
Figure 6, represents a vertical section through a regular parabolic reflector and the lens.

Now since this central area will vary as to height of the vertical beam projected, I propose a novel arrangement of the prismatic elements covering this portion of the reflector as shown in Figure 6, in which 15, represents the upper half of this window area and 16 the lower half.

The upper window 15, may have a vertical width of 1 inch more or less and will extend laterally so as to cover all that portion of the reflector in which rays subtend an angle of 1 degree and 11 minutes or more to the axis of the reflector.

It will be so constructed that its refractive power will be strongest at the top of the section, since this area of the reflector projects rays of considerable vertical rise and therefore the deflection must be strongest at this point.

This upper window section is therefore covered by this plus cylinder section, having a radius of 6 inches or more, so the refraction decreases gradually down toward the bottom of this section, where it corresponds to the center of a plus lens and the rays are left unrefracted.

The lower section 16, is a minus sectional cylinder of 1 inch width more or less, with its base down. The action of this section is practically nil at the top, but rapidly increases from the center of the reflector equal pace with the angularity of the rays reflected from the area of the reflector covered by this part of the lens.

A plane faced prism would deflect or refract all the light equally or to the same degree which is not desired, since the rays are parallel in the central meridian of the reflector, but increases rapidly down, and by using the sectional minus cylinder, instead of a plane faced prism, the increase in angularity from the reflector is met with equal pace in the lens, which would not be the case were a plane faced prism used instead of this minus sectional cylinder.

The object of the cylinders, above and below the center of the lens as best shown by 6 and 7 Figure 2 is to meet with equal pace and tendency of the rays to rapidly assume a greater angle up and down from the center of the reflector.

To meet the upward rise a plus cylinder, 6, Figure 2, is used while the lower cylinder is a minus cylinder 7, Figure 2.

The circular prisms, while they do not cover an extensive area of the reflector, nevertheless perform a very necessary function in "right lateral beam control," in that they rapidly depress all rays of light acted on by them and being covered by sectional cylinders 10, Figure 4, which are sufficiently strong to spread the light right and left laterally, practically six inches per foot, so as to quickly light up the entire road bed on each side of the car and forward to a distance of some 200 feet.

These cylinders will preferably be on a radius of $\frac{1}{16}$ inch which will allow a width of 1/8 inch. Their axes will be vertical and they will completely cover all the 7 or 8 circular prisms above and below the horizontal window section, 6 and 7 Figure 1.

It will of course be evident that the construction of the various prisms and sectional cylinders can be made of different widths and basic strength, as well as constructing the cylinder sections, on a different arc of radius, so as to meet ideas of improvement in function, as well as to meet the requirements of divers anti-glare laws, being passed and changed from time to time, by the different States, since the drawings are to a great extent only diagrammatic, and all without departing from the spirit of the invention.

Having thus described the invention, what I claim is:

1. A refracting lens or glass front for automobile headlamps, having an annular border in which all prisms are set with their bases to the right and having a substantial window area in which the upper half of the window is a plus sectional cylinder and the lower half of said window area, a minus sectional cylinder, bases down.

2. A refracting lens for automobile headlamps having an annular border comprising prisms with bases to the right, window cylinders with bases down and horizontal, intervening prisms curved on an arc of a wide segment of a circle, each with a different radius and with a common center at the center of the lens and having the outer surface of each circular prism covered with small strong sectional vertical cylinders.

3. A lens or glass front for headlamps having a substantial annular border covered with vertical prisms, bases to the right, having a central area with horizontal curved prisms bases down, having the intermediate surface covered with concentric ringed prisms, with a common center, with bases toward the center in the upper area and bases away from the center in the lower area, the entire area of each intermediate surface covered with cylinders, axes vertical.

In testimony whereof, I, the said WILLIAM H. ZORGER, have hereunto set my hand.

WILLIAM H. ZORGER.